(12) United States Patent
Choi

(10) Patent No.: US 7,141,921 B2
(45) Date of Patent: Nov. 28, 2006

(54) PLASMA DISPLAY PANEL

(75) Inventor: Seo-Young Choi, Yongin (KR)

(73) Assignee: Samsung SDI Co., Ltd., Suwon (KR)

( * ) Notice: Subject to any disclaimer, the term of this patent is extended or adjusted under 35 U.S.C. 154(b) by 200 days.

(21) Appl. No.: 10/700,633

(22) Filed: Nov. 5, 2003

(65) Prior Publication Data

US 2004/0090169 A1    May 13, 2004

(30) Foreign Application Priority Data

Nov. 6, 2002      (KR) ...................... 10-2002-0068366

(51) Int. Cl.
*H01J 17/49*      (2006.01)
(52) U.S. Cl. ...................... 313/486; 313/587
(58) Field of Classification Search ................ 313/486, 313/582, 583, 584, 585, 586, 587, 483, 484, 313/485; 252/301.4 R, 301.4 S, 301.6 S, 252/301.3 S
See application file for complete search history.

(56) References Cited

U.S. PATENT DOCUMENTS 3,631,284 A * 12/1971 Sisneros .................... 313/468
2002/0113552 A1 * 8/2002 Juestel et al. ............... 313/587

FOREIGN PATENT DOCUMENTS

| JP | 11-073138 | 3/1999 |
|---|---|---|
| KR | 010017535 | 5/2001 |
| KR | 2001-0093345 A | 10/2001 |

OTHER PUBLICATIONS

Kasei-Optonix website: http://www.kasei-optonix.co.jp/english/products/phosphor/plasma.html.*
Shionoya, S.; Yen, W.M.; Phosphor Handbook, 1999, CRC Press LLC, pp. 629.*

* cited by examiner

*Primary Examiner*—Mariceli Santiago
*Assistant Examiner*—Anne M Hines
(74) *Attorney, Agent, or Firm*—H.C. Park & Associates, PLC

(57) ABSTRACT

A plasma display panel includes a fluorescent layer having a red phosphor pattern, a green phosphor pattern, and a blue phosphor pattern, wherein the red phosphor pattern contains $Y(V,P)O_4$:Eu and $(Y,Gd)BO_3$:Eu. The plasma display panel emits red light having an appropriate luminance, improved color purity, and improved afterglow properties.

12 Claims, No Drawings

PLASMA DISPLAY PANEL

This application claims priority from Korean Patent Application No. 2002-68366, filed on Nov. 6, 2002, in the Korean Intellectual Property Office, the disclosure of which is incorporated herein by reference in its entirety.

FIELD OF THE INVENTION

The present invention relates to a plasma display panel, and more particularly, to a plasma display panel providing red light with better color purity and less afterglow.

BACKGROUND OF THE INVENTION

Plasma display panels (PDPs) form images through the excitation of phosphor by vacuum ultraviolet (UV) rays generated through plasma discharge. Such a PDP includes two electrodes in its discharge space and a fluorescent layer which is as an array of red, green, and blue phosphor patterns. When a predetermined voltage is applied across the two electrodes to induce plasma discharge, the fluorescent layer is excited by UV rays generated through plasma discharge and emits light.

Examples of inert discharge gas injected into the discharge space of PDPs include neon (Ne), helium (He), xenon (Xe), krypton (Kr). These inert gases may be used as a mixture with oxygen, nitrogen, and the like if necessary. It is known that Ne, which is one of the most widely used inert gas, emits orange-red light and thus degrades the color purity of the PDP.

$(Y,Gd)BO_3$:Eu is frequently used as a red phosphor material for PDPs. $(Y,Gd)BO_3$:Eu is brighter than other red phosphor materials but is poor in terms of color purity and afterglow properties.

One suggestion to improve the color purity of the PDP is to use an additional color-compensation filter or a front filter, having a color compensating function, which is installed in front of the PDP. However, the use of such a color-compensation filter degrades the brightness of the PDP.

SUMMARY OF THE INVENTION

The present invention provides a plasma display panel (PDP) providing red light having improved color purity and afterglow properties.

In one aspect of the present invention, a PDP includes a fluorescent layer which comprises red phosphor, green phosphor, and blue phosphor patterns, wherein the red phosphor pattern contains $Y(V,P)O_4$:Eu and $(Y,Gd)BO_3$:Eu. Based on the mixture of $Y(V,P)O_4$:Eu and $(Y,Gd)BO_3$:Eu, various levels of improved color purity, afterglow properties and luminance may be achieved.

Another PDP according to the present invention includes a fluorescent layer which comprises red phosphor, green phosphor, and blue phosphor patterns, wherein the PDP is not provided with a color-compensating filter, and the red phosphor pattern contains $Y(V,P)O_4$:Eu and $(Y,Gd)BO_3$:Eu.

A further aspect of present invention provides a PDP including a red phosphor material of $Y(V,P)O_4$:Eu and $(Y,Gd)BO_3$:Eu, a binder, and a solvent. Further, an additive may be added to the red phosphor composition to improve fluidity and processing properties.

DETAILED DESCRIPTION OF THE INVENTION

A plasma display panel (PDP) according to the present invention includes a fluorescent layer which comprises red phosphor, green phosphor, and blue phosphor patterns, wherein the red phosphor pattern contains $Y(V,P)O_4$:Eu and $(Y,Gd)BO_3$:Eu.

The PDP according to the present invention provides red light having an appropriate luminance, improved color purity, and improved afterglow properties, due to the use of a mixture of $Y(V,P)O_4$:Eu, and $(Y,Gd)BO_3$:Eu as a red phosphor material. The $Y(V,P)O_4$:Eu is responsible for improved color purity and afterglow properties and the $(Y,Gd)BO_3$:Eu is responsible for improved luminance. The luminance of the red light of the PDP according to the present invention may be slightly lower than when using $(Y,Gd)BO_3$:Eu alone as a red phosphor material, but is appropriate to control the color temperature of the PDP.

If the thickness of the red phosphor pattern is too small, the luminance of red light emitted therefrom may be too low. If the thickness of the red phosphor pattern is too large, the PDP may have a small discharge space and poor light emission efficiency, especially for red light, and thus the luminance of the red light emitted therefrom may be too low. In consideration of these effects, the red phosphor pattern may be formed to have a thickness of about 5–20 μm. However, the thickness of the red phosphor pattern of a PDP according to the present invention is not limited to the above range and other thickness may be desireable based on these and other factors.

According to an embodiment of the invention, the amount of $Y(V,P)O_4$:Eu relative to the amount of $(Y,Gd)BO_3$:Eu may alter color purity, afterglow properties, and luminance. For example, if the amount of $Y(V,P)O_4$:Eu in the red phosphor pattern is too small, improvements in color purity and afterglow properties may be lessened. If the amount of $Y(V,P)O_4$:Eu is too large, the luminance of red light may be degraded. In consideration of these effects, the amount of $Y(V,P)O_4$:Eu may be in the range of about 20–80% by weight, based on the total weight of $Y(V,P)O_4$:Eu and $(Y,Gd)BO_3$:Eu. According to another embodiment of the invention, the amount of $Y(V,P)O_4$:Eu may be about 50–80% by weight based on the total weight of $Y(V,P)O_4$:Eu and $(Y,Gd)BO_3$:Eu.

The present invention also provides a red phosphor composition for use in the manufacture of PDPs that contains a mixture of $Y(V,P)O_4$:Eu and $(Y,Gd)BO_3$:Eu as a red phosphor material, a binder, and a solvent.

In the red phosphor composition according to the present invention, the amount of $Y(V,P)O_4$:Eu and $(Y,Gd)BO_3$:Eu may be in the range of about 20–70% by weight based on the total weight of the red phosphor composition. According to another embodiment of the invention, the amount of $Y(V,P)O_4$:Eu in the red phosphor composition may be in the range of about 20–80% by weight, based on the total weight of $Y(V,P)O_4$:Eu and $(Y,Gd)BO_3$:Eu. According to another embodiment of the invention, the amount of $Y(V, P)O_4$:Eu in the red phosphor composition may be about 50–80% by weight based on the total weight of $Y(V,P)O_4$:Eu and $(Y,Gd)BO_3$:Eu.

Examples of the binder include cellulose resins, acrylic resins, and mixtures of the forgoing resins. Examples of cellulose resins include methyl cellulose, ethyl cellulose, propyl cellulose, hydroxymethyl cellulose, hydroxyethyl cellulose, hydroxyproyl cellulose, hydroxyethyl propyl cellulose, and mixtures of the forgoing celluloses. Examples of acrylic resins include polymethyl methacrylate; polyisopropyl methacrylate; polyisobutyl methacrylate; copolymers of acrylic monomers; and mixtures of the foregoing materials. Examples of acrylic monomers include methyl methacrylate, ethyl methacrylate, propyl methacrylate, butyl methacrylate, hexyl methacrylate, 2-ethylhexyl methacrylate, benzyl methacrylate, dimethylaminoethyl methacrylate, hydroxyethyl methacrylate, hydroxypropyl methacrylate, hydroxybutyl methacrylate, phenoxy-2-hydroxypropyl methacrylate, glycidyl methacrylate, methyl acrylate, ethyl acrylate, propyl acrylate, butyl acrylate, hexyl acrylate, 2-ethylhexyl acrylate, benzyl acrylate, dimethylaminoethyl acrylate, hydroxyethyl acrylate, hydroxypropyl acrylate, hydroxybutyl acrylate, phenoxy-2-hydroxypropyl acrylate, glycidyl acrylate, and the like. The red phosphor composition according to the present invention may include a small amount of inorganic binder. The amount of the binder may be in the range of about 2–8% by weight based on the total weight of the red phosphor composition.

Examples of the solvent for the red phosphor composition include alcohols, ethers, esters, and mixtures of the forgoing solvents. According to an embodiment of the invention, examples of the solvent for the red phosphor composition include butyl carbitol (BC), butyl carbitol acetate (BCA), terpineol, and a mixture thereof. If the amount of the solvent is too large or too small, the fluidity of the red phosphor composition may not be suitable to handle. In consideration of this effect, the amount of the solvent may be in the range of, for example, about 25–75% by weight based on the total weight of the red phosphor composition.

The red phosphor composition according to the present invention may further include an additive for improved fluidity and processing properties. Various kinds of additives may be used individually or in combination, for example, a photosensitizer such as benzophenone, a dispersing agent, a silicon-based antifoaming agent, a rheology modifier, a plasticizer, an antioxidant, and the like. Commercially available additives well known to those skilled in the art may be used for these purposes.

Any method of manufacturing a fluorescent layer and other elements of PDPs and any structure thereof that are known to those of ordinary skill in the art may be applied to a PDP according to the present invention. Therefore, detailed descriptions on a method of manufacturing a PDP according to the present invention and its structure are not provided here.

According to an embodiment of the invention, a PDP using the aforementioned red phosphor composition does not require an additional color-compensating filter since the red phosphor used in the PDP has improved color purity. By way of reference, color-compensating filters are formed as a layer separated from a fluorescent layer so compensate for the color of red light and/or green light and/or blue light generated from the fluorescent layer. An example of such a color-compensating filter is disclosed in Japanese Patent publication No. 1998-69859, in which a mixture of pigment powder and a low melting point lead glass is applied to a dielectric layer in a pattern aligned with the red, green, and blue phosphor patterns of the fluorescent layer to form a color filter.

Although the PDP according to the present invention provides improved red-color purity and afterglow properties of red light without a color-compensating filter, it will be appreciated that a color-compensating filter may be additionally installed in the PDP for additional color purity enhancement.

The present invention also provides a PDP including a fluorescent layer which comprises red phosphor, green phosphor, and blue phosphor patterns, wherein the PDP is not provided with a color-compensating filter, and the red phosphor pattern contains $Y(V,P)O_4$:Eu and $(Y,Gd)BO_3$:Eu. According to an embodiment of the invention, the amount of $Y(V,P)O_4$:Eu may be in the range of about 20–80% by weight, based on the total weight of $Y(V,P)O_4$:Eu and $(Y,Gd)BO_3$:Eu. According to another embodiment of the invention, the amount of $Y(V,P)O_4$:Eu may be in the range of about 50–80% by weight based on the total weight of $Y(V,P)O_4$:Eu and $(Y,Gd)BO_3$:Eu. The PDP may have a red-color purity ranging from about 0.657 to about 0.670 for a chromaticity coordinate value x and from about 0.322 to about 0.332 for a chromaticity coordinate value y. The PDP may have an afterglow decay time of about 4.0–8.8 ms for red light. According to another embodiment of the invention, the PDP may have a red-color purity ranging from about 0.660 to about 0.670 for the chromaticity coordinate value x and from about 0.322 to about 0.330 for the chromaticity coordinate value y. The PDP may have an afterglow decay time of about 4.0–8.0 ms for red light.

Another PDP according to an exemplary embodiment of the present invention includes a fluorescent layer which comprises red phosphor, green phosphor, and blue phosphor patterns, wherein the PDP is not provided with a color-compensating filter. The PDP of this example may have a red-color purity ranging from about 0.657 to about 0.670 for a chromaticity coordinate value x and from about 0.322 to about 0.332 for a chromaticity coordinate value y. The PDP of this example may be implemented by incorporating $Y(V,P)O_4$:Eu providing improved color purity and afterglow properties and $(Y,Gd)BO_3$:Eu providing improved luminance into the red phosphor pattern, as described above. The amount of $Y(V,P)O_4$:Eu may be in the range of about 20–80% by weight based on the total weight of $Y(V,P)O_4$:Eu and $(Y,Gd)BO_3$:Eu.

Another PDP according to an exemplary embodiment of the present invention includes a fluorescent layer which comprises red phosphor, green phosphor, and blue phosphor patterns, wherein the PDP is not provided with a color-compensating filter and has an afterglow decay time of about 4.0–8.8 ms for red light. The PDP of this example may be implemented by incorporating $Y(V,P)O_4$:Eu providing improved color purity and afterglow properties and $(Y,Gd)BO_3$:Eu providing improved luminance into the red phosphor pattern, as described above. The amount of $Y(V,P)O_4$:Eu may be in the range of about 20–80% by weight based on the total weight of $Y(V,P)O_4$:Eu and $(Y,Gd)BO_3$:Eu.

Still another PDP according to an exemplary embodiment of the present invention includes a fluorescent which comprises red phosphor, green phosphor, and blue phosphor patterns, wherein the PDP is not provided with a color-compensating filter. The PDP of this example may have a red-color purity ranging from about 0.660 to about 0.670 for a chromaticity coordinate value x and from about 0.322 to about 0.330 for a chromaticity coordinate value y. The PDP of this example may be implemented by incorporating $Y(V,P)O_4$:Eu providing improved color purity and afterglow properties and $(Y,Gd)BO_3$:Eu providing improved luminance into the red phosphor pattern, as described above. The amount of $Y(V,P)O_4$:Eu may be in the range of about 50–80% by weight based on the total weight of $Y(V,P)O_4$:Eu and $(Y,Gd)BO_3$:Eu.

Still another PDP according to an exemplary embodiment of the present invention includes a fluorescent layer which comprises red phosphor, green phosphor, and blue phosphor patterns, wherein the PDP is not provided with a color-compensating filter and has an afterglow decay time of about 4.0–8.0 ms for red light. The PDP of this example, may be implemented by incorporating $Y(V,P)O_4$:Eu providing improved color purity and afterglow properties and $(Y,Gd)BO_3$:Eu providing improved luminance into the red phosphor pattern, as described above. The amount of $Y(V,P)O_4$:Eu may be in the range of about 50–80% by weight based on the total weight of $Y(V,P)O_4$:Eu and $(Y,Gd)BO_3$:Eu.

The present invention will be described in greater detail with reference to the following examples. The following examples are for illustrative purposes and are not intended to limit the scope of the invention.

EXAMPLES 1 THROUGH 5

Red phosphor compositions of $Y(V,P)O_4$:Eu and $(Y,Gd)BO3$:Eu were mixed in a ratio of 40:60 (Example 1), 50:50 (Example 2), 60:40 (Example 3), 70:30 (Example 4), and 80:20 (Example 5) by weight to prepare five red phosphor compositions.

The five red phosphor compositions commonly contained 40% by weight of the mixture of $Y(V,P)O_4$:Eu and $(Y,Gd)BO_3$:Eu, 5.6% by weight of ethyl cellulose as a binder, and 54.4% by weight of a solvent mixture of butyl carbitol acetate (BCA) and terpineol in a ratio of 3:7.

Each of the red phosphor compositions was used for a red phosphor pattern when forming a fluorescent layer of a PDP through printing and calcinations. PDPs having the red phosphor patterns manufactured from the different phosphor compositions of Example 1 through 5 had no color-compensating filter. The red phosphor patterns were about 7–13 μm thick.

After only the red phosphor pattern of each of the PDPs was excited, the chromaticity coordinate, according to the CIE calorimetric system, of red light emitted from the PDP and the luminance of the red light were measured using a colorimeter (CA-100).

The red light from each of the PDPs was detected using a visible light sensor, converted into an electrical signal and amplified using a photo multiplier tube (PMT), and output to an oscilloscope. The time required for the luminance to change from 100% to 10% was measured from the oscilloscopic result and determined as an afterglow decay time of red light.

COMPARATIVE EXAMPLE 1

A red phosphor composition containing 30% by weight of $(Y,Gd)BO_3$:Eu, 7% by weight of ethyl cellulose, and 63% by weight of a solvent mixture of BCA and terpineol in a ratio of 3:7 was prepared.

A PDP was manufactured using the red phosphor composition in the same manner as in Examples 1–5. The chromaticity coordinate, afterglow decay time, and luminance of red light were measured using the PDP in the same manner as in Examples 1–5.

COMPARATIVE EXAMPLE 2

A PDP having a color-compensating filter and only $(Y,Gd)BO_3$:Eu as a red phosphor material was manufactured. The chromaticity coordinate, afterglow decay time, and luminance of red light were measured using the PDP in the same manner as in Examples 1–5.

EVALUATION RESULTS

The results of measuring the chromaticity coordinate, afterglow decay time, and luminance of red light using the PDPs manufactured in Examples 1 through 5 and Comparative Examples 1 and 2 are shown in Table 1.

TABLE 1

| Example | Chromaticity Coordinate (x, y) | | | | Afterglow Decay Time (ms) T | Luminance (%) |
|---|---|---|---|---|---|---|
| | x value | Δx | y value | −Δy | | |
| Example 1 | 0.657 | 0.003 | 0.332 | 0.006 | 7.9–8.8 | 86.0 |
| Example 2 | 0.660 | 0.006 | 0.330 | 0.008 | 7.2–8.0 | 82.5 |
| Example 3 | 0.663 | 0.009 | 0.326 | 0.012 | 6.5–7.2 | 79.0 |
| Example 4 | 0.666 | 0.012 | 0.324 | 0.014 | 5.1–5.8 | 75.5 |
| Example 5 | 0.670 | 0.016 | 0.322 | 0.016 | 4.0–5.0 | 72.0 |
| Comparative Example 1 | 0.654 | 0 | 0.338 | 0 | 9.6–10.8 | 100 |
| Comparative Example 2 | 0.663 | — | 0.332 | — | 9.6–10.8 | — |

In Table 1, Δx means an increase in the chromaticity coordinate value x with respect to the x value of the PDP of Comparative Example 1, −Δy means a decrease in the chromaticity coordinate value y with respect to the y value of the PDP of Comparative Example 1, and the luminance in percentage means the luminance of red light measured as a percentage of the luminance of red light of the PDP of Comparative Example 1.

A larger x value and a smaller y value in the chromaticity coordinate mean superior red-color purity as compared to the baseline of the PDP of Comparative Example 1. A smaller afterglow decay time of red light means a superior afterglow property and an improved sharpness of moving pictures displayed on the PDP as compared to the baseline of the PDP of Comparative Example 1.

As shown in Table 1, the PDPs manufactured in Examples 1 through 5, which contain a mixture $Y(V,P)O_4$:Eu and $(Y,Gd)BO_3$:Eu as a red phosphor in their red phosphor pattern, show an increase of about 0.003–0.016 in the chromaticity coordinate value x and a decrease of about 0.006–0.016 in the chromaticity coordinate value y, compared to the PDP manufactured in Comparative Example 1, which contains only $(Y,Gd)BO_3$:Eu as a red phosphor in its red phosphor pattern. These results indicate that the formation of a red phosphor pattern containing $Y(V,P)O_4$:Eu and $(Y,Gd)BO_3$:Eu improves the red-color purity of a PDP and eliminates or reduces the need for a color-compensating filter.

In addition, the afterglow decay time of red light ranges from 4.0 to 8.8 ms for the PDPs of Examples 1 through 5 demonstrate improvements when compared to the PDP of Comparative Example 1 having an afterglow decay time of about 9.6–10.8 ms.

The luminances of red light of the PDPs manufactured in Examples 1 through 5 are slightly lower than the luminance of the PDP manufactured in Comparative Example 1 but are large enough to adjust the color temperature of PDPs.

Compared to the PDP of Comparative Example 2, which contains only $(Y,Gd)BO_3$:Eu as a red phosphor and has a color-compensating filter, the PDPs of Examples 1 through 5 show similar or superior red-color purity and improved afterglow properties.

As described above, a PDP according to the present invention contain both $Y(V,P)O_4$:Eu and $(Y,Gd)BO_3$:Eu as a red phosphor material in the red phosphor pattern of its fluorescent layer and has improved red-color purity and afterglow properties of red light even when an additional color-compensating filter is not installed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A plasma display panel comprising a fluorescent layer that includes a red phosphor pattern, a green phosphor pattern, and a blue phosphor pattern, the red phosphor pattern containing $Y(V,P)O_4$:Eu and $(Y,Gd)BO_3$:Eu and having a red-color purity ranging from 0.657 to 0.670 for a chromaticity coordinate value x and from 0.322 to 0.327 for a chromaticity coordinate value y, and wherein the amount of $Y(V,P)O_4$:Eu is in the range of 20–80% by weight based on the total weight of $Y(V,P)O_4$:Eu and $(Y,Gd)BO_3$:Eu.

2. The plasma display panel of claim 1, wherein the amount of $Y(V,P)O_4$:Eu is in the range of 50–80% by weight based on the total weight of $Y(V,P)O_4$:Eu and $(Y,Gd)BO_3$:Eu.

3. A plasma display panel comprising a fluorescent layer that includes a red phosphor pattern, a green phosphor pattern, and a blue phosphor pattern, wherein the plasma display panel is without a color-compensating filter, the red phosphor pattern contains $Y(V,P)O_4$:Eu and $(Y,Gd)BO_3$:Eu, and the red light has an afterglow decay time of 4.0–8.8 ms and a red-color purity ranging from 0.663 to 0.670 for a chromaticity coordinate value x and from 0.322 to 0.327 for a chromaticity coordinate value y.

4. The plasma display panel of claim 3, wherein the amount of $Y(V,P)O_4$:Eu is in the range of 20–80% by weight based on the total weight of $Y(V,P)O_4$:Eu and $(Y,Gd)BO_3$:Eu.

5. The plasma display panel of claim 3, wherein the amount of $Y(V,P)O_4$:Eu is in the range of 50–80% by weight based on the total weight of $Y(V,P)O_4$:Eu and $(Y,Gd)BO_3$:Eu.

6. The plasma display panel of claim 3, having an afterglow decay time of 4.0–8.0 ms for red light.

7. A plasma display panel comprising a fluorescent layer that includes a red phosphor pattern, a green phosphor pattern, and a blue phosphor pattern, wherein the plasma display panel is not provided with a color-compensation filter, and the red phosphor pattern includes $Y(V,P)O_4$:Eu and $(Y,Gd)BO_3$:Eu with a combined red-color purity ranging from 0.657 to 0.670 for a chromaticity coordinate value x and from 0.322 to 0.327 for a chromaticity coordinate value y.

8. The plasma display panel of claim 7, wherein the amount of $Y(V,P)O_4$:Eu is in the range of 20–80% by weight based on the total weight of $Y(V,P)O_4$:Eu and $(Y,Gd)BO_3$:Eu.

9. The plasma display panel of claim 8, wherein the amount of $Y(V,P)O_4$:Eu is in the range of 50–80% by weight based on the total weight of $Y(V,P)O_4$:Eu and $(Y,Gd)BO_3$:Eu.

10. A plasma display panel comprising a fluorescent layer that includes a red phosphor pattern, a green phosphor pattern, and a blue phosphor pattern, wherein the plasma display panel is without a color-compensation filter, and the red phosphor pattern includes $Y(V,P)O_4$:Eu and $(Y,Gd)BO_3$:Eu with a combined red-color purity ranging from 0.660 to 0.670 for a chromaticity coordinate value x and from 0.322 to 0.327 for a chromaticity coordinate value y.

11. The plasma display panel of claim 10, wherein the plasma display panel has an afterglow decay time of 4.0–8.0 ms for red light.

12. The plasma display panel of claim 11, wherein the red phosphor pattern contains $Y(V,P)O_4$:Eu and $(Y,Gd)BO_3$:Eu.

* * * * *